United States Patent [19]
Claassen et al.

[11] 4,425,800
[45] Jan. 17, 1984

[54] MEANS FOR ASCERTAINING THE INTERNAL PRESSURE IN A PRESSURE PIPE SYSTEM

[75] Inventors: Peter Claassen; Rudolf Zeiringer, both of Graz, Austria

[73] Assignee: Hans List, Graz, Austria

[21] Appl. No.: 272,007

[22] Filed: Jun. 9, 1981

Related U.S. Application Data

[63] Continuation of Ser. No. 178,587, Aug. 15, 1980, abandoned, which is a continuation of Ser. No. 17,121, Mar. 5, 1979, abandoned, which is a continuation of Ser. No. 793,365, May 3, 1977, abandoned.

[30] Foreign Application Priority Data

May 7, 1976 [AT] Austria .................................. 3348/76
May 21, 1976 [AT] Austria .................................. 3757/76

[51] Int. Cl.³ .......................... G01L 7/08; G01L 9/00
[52] U.S. Cl. ..................................... 73/730; 73/119 A
[58] Field of Search ................ 73/730, 119 A, 35, 167

[56] References Cited

U.S. PATENT DOCUMENTS

3,128,628  4/1964  Lebow .................................. 73/730
3,418,853  12/1968  Curtis ................................... 73/730
3,511,088  5/1970  Weaver .............................. 73/119 A

*Primary Examiner*—Donald O. Woodiel
*Attorney, Agent, or Firm*—Watson, Cole, Grindle & Watson

[57] ABSTRACT

A device for ascertaining the internal pressure in a pressure system, particularly in a fuel injection pipe system, wherein the pressure to be measured is contained within an element which includes at one point a wall portion of reduced thickness so as to act like a membrane, and wherein a sensor device is included which is positionable in engagement with the membrane-like wall portion to detect any elastic deformation and variation of the membrane caused by the influence of the internal pressure.

6 Claims, 10 Drawing Figures

MEANS FOR ASCERTAINING THE INTERNAL PRESSURE IN A PRESSURE PIPE SYSTEM

This application is a continuation application of application Ser. No. 178,587, filed Aug. 15, 1980, now abandoned, which is a cont. of Ser. No. 17,121 filed Mar. 5, 1979, now abandoned, which is a cont. of Ser. No. 793,365 filed May 3, 1977, now abandoned.

BACKGROUND OF THE INVENTION

1. Field of the Invention

This invention concerns a device for ascertaining the internal pressure in a pressure pipe system, especially in a fuel injection pipe system.

2. Description of the Prior Art

The constant monitoring of internal pressure in a pressure system by means of pressure gauges, e.g. manometric pressure gauges which are included in the pressure system and directly exposed to the pressure medium in the pipes, is common practice in many sectors of industrial technology.

In pipes which do not require constant monitoring, but which instead need only occasional checks of pressure conditions, the provision of a pressure gauge which is permanently included in the system increases assembly work and costs, and is hardly an economically justifiable proposition. This applies, for example, to the testing of pressure conditions in a fuel injection pipeline for diesel engines which is needed only at certain intervals of time or in case of malfunction. The primary objective of such tests is to detect significant points of the injection pressure curve relative to the respective crank angle, with only a secondary interest in measuring absolute pressure values and recording the time-pressure curve in the fuel injection pipes. However, the measuring of pressure in the fuel injection pipes always presents problems in as much as the pressure volume must be broached to allow a pressure gauge to be introduced and the measuring instrument must be screwed directly into the injection pipe. Apart from the awkwardness and inconvenience of such an operation and the considerable loss of time caused thereby, this method entails a further and rather more serious disadvantage. This arises from the high pressures in the fuel injection pipes where it is in most cases very difficult, after repeated disconnection and reconnection of the pipe system for the purpose of introducing and subsequently extracting pressure gauges, to restore every time the vitally important perfect seal for the pipe system as a whole. Most fuel injection pipe connections are not adapted to permit such frequent unscrewing and screwing together again without resulting in defective seals. Moreover, when the threaded joints of the injection pipes are tightened, the high torque which has to be applied for this purpose frequently causes frictional abrasion and dislodgement of small chips of metal. These chips tend to be the cause of recurring trouble in the injection nozzle or jet assembly, chiefly by jamming the jet needle.

In view of these disadvantages there has been a long-standing search for new ways which would allow the internal pressure to be measured, especially in fuel injection pipe systems, without opening up or interrupting the pressure system. Various types of pressure-applying devices have been developed which are usually clamped onto the fuel injection pipe and whereby the internal pressure in the pipe can be ascertained from the resulting elastic deformation of the pipe. However, all previously known forms of such external pressure applying devices were found unsuitable for practical application to different types of engines owing to the differences in the various fuel injection pipe systems and the substantial accelerations and vibrations to which the fuel injection pipes are nearly always exposed.

It is the aim of this invention to provide a means for ascertaining the internal pressure in a pressure system, especially in a fuel injection pipe system, which avoids the disadvantages appertaining to conventional arrangements and which is distinguished by its simplicity, reliability and a minimum of fitting work required for the measuring process.

SUMMARY OF THE INVENTION

According to this invention, this aim is realised by virtue of the fact that the pressure volume of the system is defined, at least at one point thereof, by a wall portion of reduced thickness which is adapted to be elastically deformed by the internal pressure in the manner of a diaphragm or membrane, and to the outside of which a detector or sensor device is adapted to be fitted so as to be pressed against the thinner wall portion to detect any elastic deformation and variation in the said wall portion.

Such an arrangement, which is applicable to high pressure systems of a wide variety of types and also may be subsequently added to existing systems with a minimum outlay and expense, allows the exact and infinitely repeatable measuring of internal pressure in a pressure system without requiring the latter to be broached or interrupted in any way. The merely temporary operation of fitting and removing the detector involves no more than a few simple manipulations which may be readily performed even by unskilled labor thereby affording a considerable saving in time and labor costs as compared with conventional pressure-testing methods.

The arrangement provides precise measuring results which can always be reproduced when required whilst also achieving a higher degree of measuring sensitivity than conventional testing devices of the kind allowing interior pipe pressure to be ascertained from the elastic expansion of the injection pipes which, as a rule, have fairly thick walls, because the membrane-like wall portion which is exposed to the internal pipe pressure is capable of far more sensitive elastic deformation than a pipe of uniform wall thickness.

It was found that the force variations registered by the detector or sensor instrument, e.g. a loadmeasuring cell, in consequence of the elastic deformation of the membrane under internal pressure is largely proportional with the pressure fluctuations within the pipe system, so that precise and always reproduceable measuring results are obtained.

The preparation or adaptation of the pressure system in question merely involves the provision of one, or several, membrane-like wall portion(s) at the most appropriate point(s) of the system. Since there is no longer any need to disconnect any of the component parts in the system, there is no possible risk of impaired seals or faults arising in the pipe system due to abraded metal chips or particles.

Whilst with regard to the choice of position for the membrane-like wall portion and its particular form of execution there is a large degree of freedom and adaptability to the associated pressure system, a particularly simple form of execution is obtained, in further development of this invention, by arranging for the membrane-like wall portion to be provided by a recess or orifice on the exterior side of the wall which encloses the pressure volume, e.g. a pressure pipe. This orifice may be formed by a simple milling or drilling operation and may be provided at a point of the pressure system which is particularly well suited by reason of its accessibility for the quick fitting and removal of the detector device.

In one form of execution of the invention special advantages result from the fact that the pressure volume is a duct or a bore, e.g. of circular cross section, and the exterior surface of the membrane-like wall portion extends parallel with the axis of the duct or bore. This arrangement, wherein the domed or radiussed circumferential wall of the duct, or bore, represents the inside of the membrane-like wall portion, is particularly well suited for subsequent application to an existing system. It also permits the detector to be secured in a particularly easy way with the aid of a clamping strap which embraces the associated part of the pressure system on one side thereof and is supported from or by the side of the part which is situated opposite the membrane-like wall portion.

In another embodiment of the invention the pressure volume comprises an outwardly directed bore and the exterior surface of the membrane-like wall portion extends normal to the axis of the bore. Such an arrangement will be particularly advantageous if the pressure system comprises an angle piece containing the junction between two relatively perpendicular pressure bores or duct.

In the last mentioned case, according to a further provision of this invention, the outwardly directed bore may advantageously be a blind bore and the bottom of the blind bore, or recess, may constitute the inner wall face of the membrane-like wall portion. In this way a diaphragm-like wall portion of any desired thickness is obtained with mutually parallel inner and outer wall surfaces which has the defined elastic behavior of a clamped circular disc.

In modification of such an arrangement and in further development of this invention, the outwardly directed bore may extend through an exterior wall face of the associated component part of the pressure system which is vertical relative to the bore and the membrane-like wall portion may be in the form of a flexible disc, or the like, sealingly secured to the exterior surface of the component so as to close the bore on the outside. This has the advantage that the membrane-like wall portions could be separately mass-produced from a material which is especially suited for this purpose with strict adherence to specified wall thickness and exterior dimensions.

According to this development of the invention the flexible disc, or like part, may then be welded to the outer surface of the component in question. Naturally the choice of the securing method will be primarily governed by the maximum internal pressure likely to occur within the associated pressure system.

A further embodiment of this invention is characterised in that at least one component of the pressure system is provided with at least one receiving or socket bore, formed as a recess or blind bore, and extending in the direction towards the pressure volume, the bottom or end wall of the recess co-acting with the circumferential wall of the pressure volume to form the membrane-like wall portion and the detector device, e.g. a load measuring or sensor cell, being adapted to be inserted therein and to be pressed against the membrane-like wall portion.

The operation of equipping a given pipe system in this way essentially involves no more than the fitting of one or more socket bores at the most appropriate points of the pressure system. Since the component which comprises the socket bore remains permanently attached to the pressure pipe, there can never be any difficulties with regard to defective seals or trouble caused by abraded metal particles in the pipe system.

In a preferred form of execution of this invention the bottom or end wall of the socket bore is plane and the detector device has a plane sensor surface engaging with said end wall. This ensures perfect transmission of the elastic membrane movements to the detector device, irrespective of whether the force at the membrane or its deformation are measured.

According to one form of execution of the invention the socket bore, or bores, is/are formed in an adapter piece which is included in, or connected to, the pipe system, preferably by screw joint. This embodiment of the invention is particularly suitable for application to engines which are not originally equipped by the makers for testing of fuel injection pipe pressure. Such an adapter piece is screwed into the fuel injection system for the initial pressure test and remains in place for any later tests which may be needed.

Since an adapter of this kind is a component which can be inexpensively mass produced, such an accessory will not cause any significant additional expense. To ensure ready access of the socket bore for introduction of the detector irrespective of the prevailing position of the adapter piece, it is recommended to provide the latter with a plurality of circumferentially evenly spaced socket bores.

In another form of execution of this invention the socket bore, or bores, may be provided in a connector part of the pipe system, e.g. in a connector nipple for the fuel injection pump. This would be particularly suitable if adopted as part of the standard equipment of the engine.

It is particularly advantageous if the pressure volume of the system component which comprises the socket bore, or bores, has a larger interior diameter than the remaining cross section of the pipe system, because in this way greater flexibility of the membrane, and therefore greater sensitivity of the measuring device, can be achieved.

Alternatively the pipe itself may comprise one or more socket bores. The usually rather substantial wall thicknesses of fuel injection pipes permit the provision or forming therein of socket bores of sufficient depth even for pipes which have a comparatively small outside diameter. The special advantage of this arrangement resides not only in that it involves a minimum of machining or other work, but also in that fuel injection pipes are generally the most readily accessible component parts of the fuel injection system. Such an arrangement still further facilitates and simplifies the operations of fitting and removing the sensor.

Furthermore, according to this invention, the component, or the pipe itself, which comprises the socket bore, or bores, may be provided on the side thereof which is opposite to said bore, with a counter bearing or engagement point, e.g. in the form of a tapered recess formed therein, adapted to be engaged by one arm of a clamping strap unilaterally embracing the said component, or pipe whilst the other arm of the strap carries the sensor device. In that event the socket bore would be a smooth cylindrical recess adapted to receive the likewise smooth, cylindrical head portion of the sensor device. Apart from simplified manufacture, this arrangement has the added advantage that the measuring or detector-line or wire which issues from the sensor device cannot become twisted as could easily happen under unskilled handling with a detector which is screwed into place.

In order to ensure that the socket bore will not become clogged up by dirt when the detector is not fitted therein and also to protect the membrane against damage from the exterior and from the harmful consequences of constantly alternating stress loads, a further development of this invention provides the socket bore with an interior thread adapted optionally to receive the sensor device or a screw plug whereof the inner end wall engages with the bottom wall of the socket bore. In this way the membrane receives support on its exterior side and is prevented from constantly following the oscillations of pressure pulsations in the pipe system.

According to another advantageous development of this invention the component of the system which contains the socket bore is provided on the side thereof which is opposite to the socket bore with a blind bore, or recess, extending co-axially with the socket bore and through the pressure volume itself, whereof the plane bottom or end wall forms the inner wall face of the membrane and which is sealed off relative to the outside by a plug or like closure comprising a concentric tapered recess in its exterior end wall to provide an engagement point or counterbearing for the clamping strap which carries the detector device. The membrane between the bottom wall of the socket bore and the inner end wall of the oppositely situated recess will thus assume the form of a circular disc with a well defined elastic behavior. The recess may be sealed to the outside by impressing therein a smooth walled cylindrical plug of sufficiently larger diameter to ensure a safe press-fit. In the case of extremely high fuel injection pressures, however, it is advisable to close the blind bore or recess by means of a screw threaded plug.

DESCRIPTION OF THE DRAWINGS

The invention is hereinafter more specifically explained with reference to preferred embodiments thereof shown in the accompanying drawings wherein.

DESCRIPTION OF THE PREFERRED EMBODIMENTS

Figure 1:
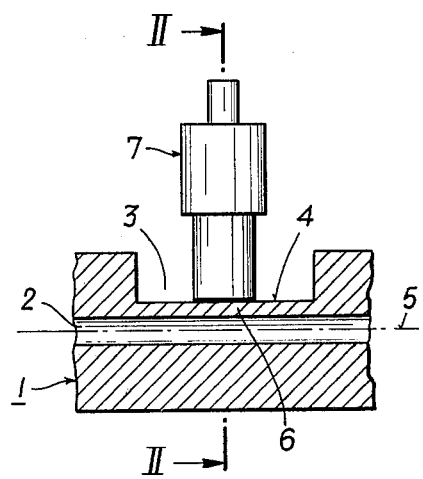
FIG. 1 is an axial section of a first embodiment of this invention.
Figure 2:
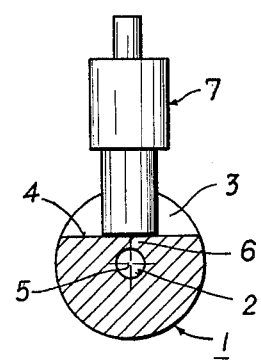
FIG. 2 is a section taken on the line II—II in FIG. 1.

FIGS. 1 and 2 illustrate a portion of a component part 1 of a pressure system in respect of which it is desired to ascertain prevailing internal pressure. For example, the system is a fuel injection pipe system for a Diesel engine with a cylindrical axially extending pressure bore or duct 2. The component part 1 comprises a recess 3 formed, e.g. by milling, in its exterior wall face and whereof the bottom wall face 4 extends parallel with the axis 5 of the pressure duct or bore 2. In the illustrated example this bottom wall face 4 is a plane surface. Alternatively, this bottom wall face 4 may, however, also extend at any desired angle of curvature.

As a result of the provision of the recess 3 a wall portion 6 of reduced wall thickness is formed in the region between the pressure bore 2 and the bottom wall face 4 which is elastically deformable in the manner of a membrane or diaphragm under the influence of interior pressure in the bore 2. For ascertaining the value of this pressure in the bore 2, e.g., in the course of routine checking of the fuel injection system for a Diesel engine, a sensor device 7 which permits registration of elastically-mechanical variations at the membrane-like wall portion 6, e.g. a load-sensor cell, is applied in the region of the wall portion 6 to the end wall 4 of the recess 3. Suitable retaining means, not illustrated in the drawing, take care of adequate temporary fixation of the sensor device 7 to the component part 1. For example, such temporary fixation of the sensor device 7 may be achieved by means of a clamping strap, not shown, which embraces the component part 1 on one side thereof, one of its arms carrying the sensor device 7 and the other arm bearing against the side of the part 1 which is opposite to the recess 3.

In view of the fact that far greater elastic deformation will be produced in the region of the membrane-like wall portion 6 under the influence of internal pressure in the bore 2 than could be produced in a pipe of constant wall thickness, the measuring device achieves a considerably higher degree of sensitivity than conventional devices of the kind which permit internal pressure to be determined from the expansion of the solid-walled pipe. Moreover, the fitting and removal of the sensor device require no skill whatsoever and are very quickly and effortlessly performed by anyone.

Figure 3:
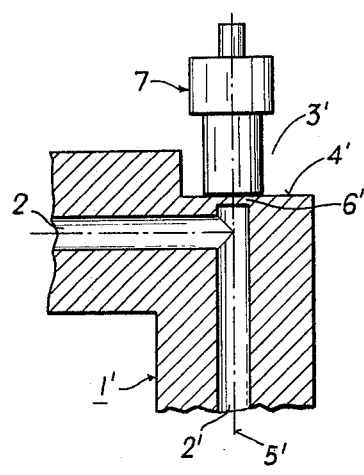
FIG. 3 is a longitudinal section of another embodiment of the invention.

The component part 1' shown in FIG. 3 is an angle, or elbow which is part of the associated pressure system and contains two relatively perpendicularly intersecting pressure bores 2,2' whereon one 2' is a blind bore. A recess 3' is formed, e.g. by milling, in the angle piece 1' with its bottom wall 4' extending perpendicularly relative to the axis 5' of the blind bore 2'. The membrane-like wall portion 6' which is here formed between the bottom wall of the blind bore 2' and the end wall 4' is corresponding to a circular disc having well defined elastic behavior. The bottom wall of the blind bore 2' which in the illustrated example is also plane, might also be domed or radiussed in any desired manner.

Figure 4:
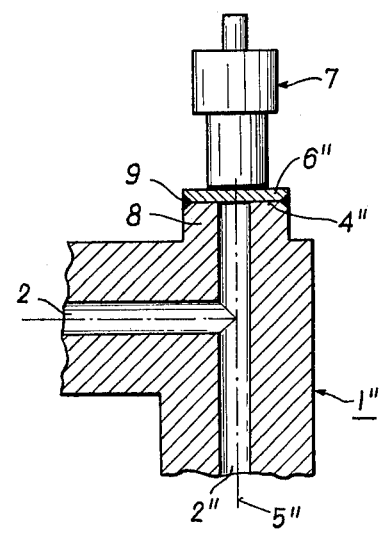
FIG. 4 is a longitudinal section of a further embodiment of this invention.

FIG. 4 shows a modification of the embodiment illustrated in FIG. 3. Again the component part is an angle or elbow piece 1" with relatively perpendicular bores 2 and 2', however, the bore 2" extends through the exterior end wall 4" perpendicular with its axis 5" of an extension 8 of the angle piece 1". The bore 2" is sealed off by a flexible sealing disc 6" secured to its outer wall surface 4" and forming the membrane-like wall portion. In the illustrated case the disc 6" is connected under hermetic seal with the extension 8 by a welded annular seam 9. The special advantage presented by the arrangement according to FIG. 4 resides in that the most suitable material may in each case be selected for the flexible disc 6" and wall thickness as well as external dimensions of this disc 6" may be adhered to with strictest accuracy.

Figure 5:
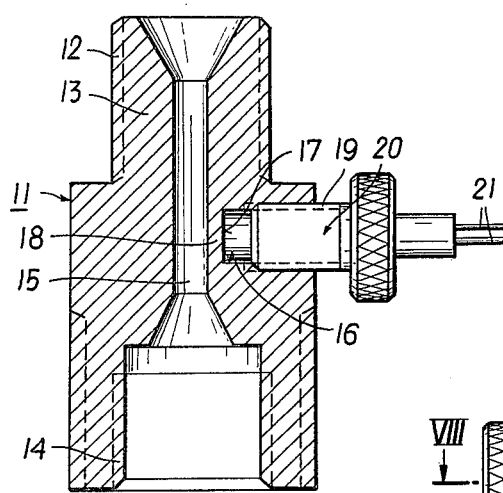
FIG. 5 is an axial section of yet another embodiment.

FIG. 5 illustrates an adapter 11 comprising at one end thereof a connector socket 13 provided with an exterior screw thread 12 whilst the opposite end is a threaded nut with female thread 14. This adapter 11 defines a pressure volume in the form of an axial bore 15 tapering conically outwardly towards both ends thereof. It is screwed under seal as an intermediate or junction piece into an existing pipe system under pressure, e.g. a fuel injection pipe system, whereof the internal pressure is to be measured, and then remains in position in the associated system, not here shown, for future pressure testing.

The adapter 11 comprises a socket bore 16 formed as a blind recess and extending transversely of the axial bore 15, the plane end wall 17 of which coacts with the bore 15 to form an inwardly domed membrane 18 exposed to the interior pressure of the system in question. The socket bore 16 has a female thread adapted to engage with the corresponding male thread 19 provided on a sensor device, e.g. a load sensor cell 20, whereof the operative sensor surface engages with the end wall 17 of the membrane 18. The load sensor cell 20 will be screwed into the socket bore 16 only for the duration of the pressure test. It is connected by measuring wires 21 to an evaluator and indicator device (not illustrated).

In the presence of internal pressure within the system the membrane 18 will be subject to elastic deformation which is registered by the load cell 20. The force variation registered by the cell is largely proportional to pressure variation in the system. Consequently this device is capable of registering time-pressure curves as well as individual significant pressure impulses which are delivered at a certain pressure level. For test purposes, e.g. of the fuel injection system for a Diesel engine, the overall time-pressure curve is usually not required, but it is generally sufficient to register pressure impulses and their relation with the prevailing angular position of the engine crankshaft. From these data it is possible to draw highly important conclusions with regard to the setting and the condition of the fuel injection pump and its adjustment and regulator means, and to observe the influence of engine speed on the injection process.

Figure 6:
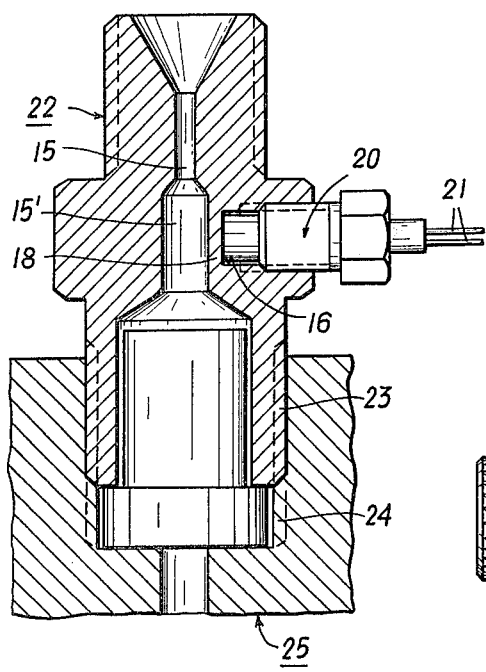
FIG. 6 shows another embodiment of the invention, likewise in axial section.

In the example shown in FIG. 6 the socket bore 16 for the load sensor cell 20 is provided in an integral part of the system in question, in the illustrated case in a connector nipple 22 for an injection pipe whereof the exterior thread 23 is engaged in the associated threaded bore 24 of a fuel injection pump 25. The axial bore 15 of the nipple 22 which represents the pressure volume here comprises a portion 15' of enlarged diameter in the region of the membrane 18. This imparts a higher degree of flexibility to the membrane 18 which in turn produces greater sensitivity for the measuring device.

Figure 7:
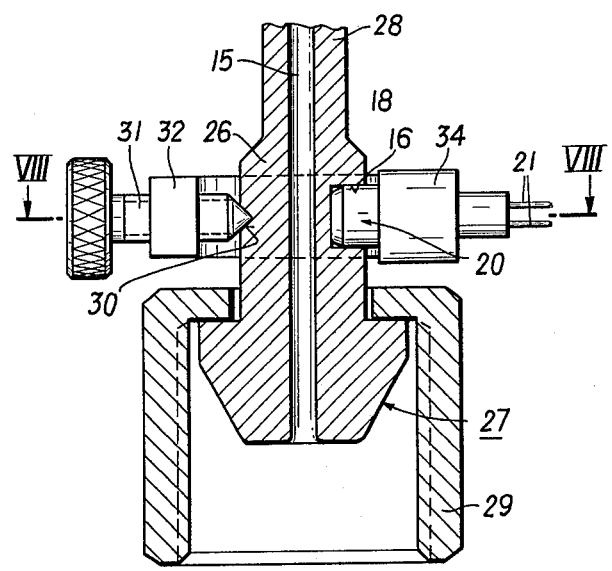
FIG. 7 is an axial section of a further embodiment.
Figure 8:
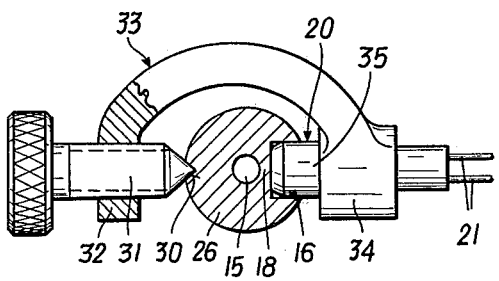
FIG. 8 is a plan view of the device, partly in sectional representation along the line VIII—VIII in FIG. 7.

In the arrangement according to FIGS. 7 and 8 a smooth cylindrical socket bore 16 is provided on the slightly longer than standard shank portion 26 of a connector nipple 27 of the injection pipe system 28. This connector nipple 27 is secured to the associated part of the injection system, e.g., an injection nozzle, in conventional manner, e.g., by means of a cap nut 29.

On the side of the nipple 27 which is opposite to the socket bore 16, the shank portion 26 in this case comprises a conical recess 30 providing an engagement point or counterbearing wherein engages the point of a thrust screw 31 engaged in one arm 32 of a clamping strap 33 whilst the opposite arm 34 of the strap carries the load sensor cell 20 which in this case comprises a smooth cylindrical head portion 35 engaging in the socket 16. This last described arrangement is distinguished in that it requires a minimum of working and by its extremely easy manipulation in the fitting of the load cell 20.

Figure 9:
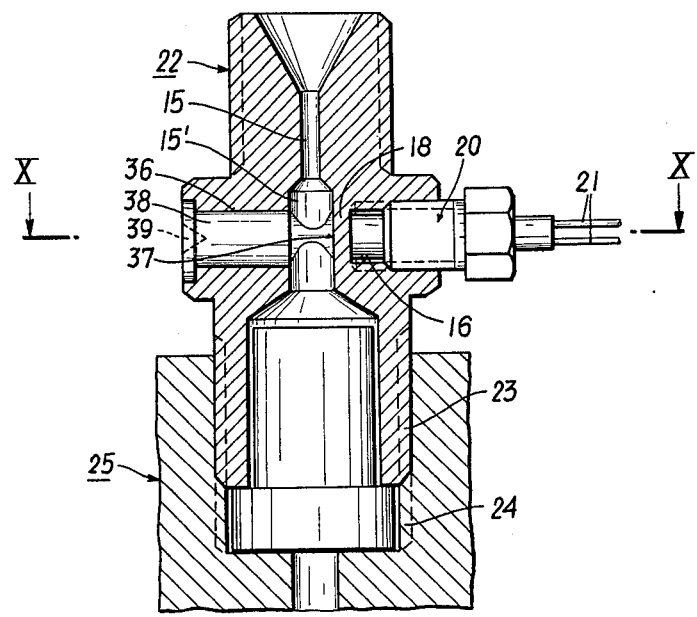
FIG. 9 is an axial section of a further embodiment.
Figure 10:
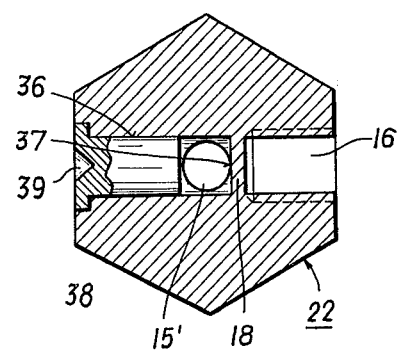
FIG. 10 is the corresponding section taken along X—X of FIG. 9.

FIGS. 9 and 10 illustrate a modified form of execution of the device shown in FIG. 6. Here is the connector nipple 22 is formed on the side thereof which is opposite the socket bore 16 with a blind bore or recess 36 extending co-axially with the socket bore 16 and through the pressure volume 15', said recess having a plane bottom or end wall 37 which forms the inner wall face of the membrane 18. As a result of this, the membrane 18 constitutes a circular disc with a well defined elastic behavior. In order to avoid potential tension-fissures or cracks it is advisable to chamfer the circumferential edge of the membrane 18.

The recess 36 is closed to the outside by a press-fitted smooth walled cylindrical plug 38. If, instead of the screwed-in load sensor cell 20, a clamping strap mounting is provided for the sensor device, similar to the arrangement shown in FIGS. 7 and 8, the plug or stopper 38 could be provided with a concentric tapered recess 39 in its outer end wall which would constitute the engagement point or counterbearing for the pressure screw of the clamping strap which carries the sensor device.

In modification of the hereinbefore described and illustrated forms of execution it is also possible within the scope of this invention to provide wall portions of reduced wall thickness and with the behavior of an elastic membrane in other component parts of pressure systems, e.g., in connector nipples or specially purpose made adapters.

I claim:
1. A means for ascertaining the internal pressure in an injection pump system which comprises
   a solid, one piece connector nipple which is interconnectable with the injection pump system, said connector nipple including a generally cylindrically-shaped portion which defines an outer surface and includes an axial passageway extending therethrough, said generally cylindrically-shaped portion also including at least one blind bore extending inwardly from said outer surface toward said axial passageway, the bottom of each said blind bore being smooth and defining a wall portion of said connector nipple which is sufficiently thin that it is elastically deformable when subjected to the pressure of a pressure fluid in said axial passageway,
   a holding device, and
   a load sensor cell mounted on said holding device, said load sensor cell being shaped to fit within each said blind bore such that, when solely and temporarily pressed into direct contact with the smooth bottom of a particular blind bore by means of said holding device, it will measure the elastic deformity in the associated wall portion of said connector nipple and thus provide information as to the internal pressure in said axial passageway and consequently in the injection pump system.

2. A means according to claim 1, wherein said axial passageway has a circular cross section.

3. A means for ascertaining the internal pressure in a pressure system which comprises a solid, one piece element which is interconnectable with the pressure system, said element including a generally cylindrically-shaped portion which defines an outer surface and includes an axial passageway extending therethrough, said generally cylindrically-shaped portion also including at least one blind bore extending inwardly from its outer surface toward said axial passage, the bottom of each said blind bore being smooth and defining a wall portion of said element which is sufficiently thin that it is elastically deformable when subjected to the pressure of a pressure fluid in said axial passageway, said generally cylindrically-shaped portion also including a conical recess extending inwardly from its outer surface radially opposite each said bore therein, a holding device in the form of a clamp strap which has two opposite ends, a first of said two opposite ends being engagable in each said conical recess in the cylindrically-shaped portion of said element, and a load sensor cell mounted on a second of said two opposite ends of said clamp strap said load sensor cell being shaped to fit within each said blind bore such that, when solely and temporarily pressed into direct contact with the smooth bottom of a particular blind bore by means of said holding device, it will measure the elastic deformity in the associated wall portion of said element and thus provide information as to the internal pressure in said axial passageway and consequently in the pressure system.

4. A means for ascertaining the internal pressure in a pressure system which comprises a solid, one piece element which is interconnectable with the pressure system, said element including a generally cylindrically-shaped portion which defines an outer surface and includes an axial passageway extending therethrough, said generally cylindrically-shaped portion also including at least one blind bore extending inwardly from its outer surface toward said axial passage, the bottom of each said blind bore being smooth and defining a wall portion of said element which is sufficiently thin that it is elastically deformable when subjected to the pressure of a pressure fluid in said axial passageway, said generally cylindrically-shaped portion also including a blind cylindrical recess extending radially inwardly from its outer surface directly opposite each blind bore therein and extending to the surface of said wall portion of the associated blind bore and a cylindrical plug which extends in each said blind cylindrical recess from the outer surface of said generally cylindrically-shaped portion to said axial passageway, each said cylindrical plug including an indentation in its end surface at said outer surface of said generally cylindrically-shaped portion of said element, a clamp strap which has two opposite ends, a first of said two opposite ends being engagable in said indentation in each said cylindrical plug, and a load sensor cell mounted on a second of said two opposite ends of said clamp strap, said load sensor cell being shaped to fit within each said blind bore such that, when solely and temporarily pressed into direct contact with the smooth bottom of a particular blind bore by means of said holding device, it will measure the elastic deformity in the associated wall portion of said element and thus provide information as to the internal pressure in said axial passageway and consequently in the pressure system.

5. A means for ascertaining the internal pressure in a pressure system which comprises a solid, one piece element which is interconnectable with the pressure system, said element including a generally cylindrically-shaped portion which defines an outer surface and includes an axial passageway extending therethrough, said generally cylindrically-shaped portion including at least one blind cylindrical bore extending radially inwardly from said outer surface toward said axial passageway, the bottom of each said blind cylindrical bore being initially flat and defining a wall portion of said element which is sufficiently thin that it is elastically deformable when subjected to the pressure of a pressure fluid in said axial passageway, the sides of each said blind cylindrical bore being threaded, a holding device in the form of a hollow, cylindrically-shaped frame which is threaded along its outer side so as to be threadingly engagable with the threaded sides of each said blind cylindrical bore, and a cylindrically-shaped load sensor cell mounted within said cylindrically-shaped frame of said holding device, said cylindrically-shaped load sensor cell having a flat head and being dimensioned to fit within each said blind cylindrical bore such that, when said flat head thereof is solely and temporarily pressed into direct contact with the bottom of a blind cylindrical bore by means of said holding device, it will measure the elastic deformity in the associated wall portion of said element and thus provide information as to the internal pressure in said axial passageway and consequently in the pressure system.

6. A means for ascertaining the internal pressure in a pressure system which comprises a solid, one piece element which is interconnectable with the pressure system, said element including a generally cylindrically-shaped portion which defines an outer surface and includes an axial passageway extending therethrough, said generally cylindrically-shaped portion including at least one blind cylindrical bore extending radially inwardly from said outer surface toward said axial passageway, the bottom of each said blind cylindrical bore being initially flat and defining a wall portion of said element which is sufficiently thin that it is elastically deformable when subjected to the pressure of a pressure fluid in said axial passageway, a holding device in the form of a clamping strap which is capable of fitting around said generally cylindrically-shaped portion where each said blind cylindrical bore is located, said clamping strap including two opposite ends having respective holes therethrough, said clamping strap including an attachment means extending through a first of said respective holes so as to extend inwardly of said clamping strap and be adjustable with respect thereto, a cylindrically-shaped load sensor cell extending through the second of said respective holes in said clamping strap so as to extend inwardly of said clamping strap, said cylindrically-shaped load sensor cell having a flat head and being dimensioned to fit within each said blind cylindrical bore such that, when said flat head thereof is solely and temporarily pressed into direct contact with the bottom of a blind cylindrical bore by means of said holding device, it will measure the elastic deformity in the associated wall portion of said element and thus provide information as to the internal pressure in said axial passageway and consequently in the pressure system.

* * * * *